US008645948B2

(12) United States Patent
Kelley (10) Patent No.: US 8,645,948 B2
(45) Date of Patent: Feb. 4, 2014

(54) APPARATUS AND METHODS FOR CLIENT-DRIVEN SERVER-SIDE INSTALLATION

(75) Inventor: Brian H. Kelley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1267 days.

(21) Appl. No.: 11/609,462

(22) Filed: Dec. 12, 2006

(65) Prior Publication Data

US 2008/0141244 A1 Jun. 12, 2008

(51) Int. Cl.
*G06F 9/445* (2006.01)
*G06F 15/16* (2006.01)

(52) U.S. Cl.
USPC ............................. 717/176; 709/202; 709/203

(58) Field of Classification Search
None
See application file for complete search history.

(56) References Cited

U.S. PATENT DOCUMENTS

| | | | | |
|---|---|---|---|---|
| 5,931,909 A * | 8/1999 | Taylor | | 709/221 |
| 5,950,010 A * | 9/1999 | Hesse et al. | | 717/178 |
| 5,953,532 A * | 9/1999 | Lochbaum | | 717/176 |
| 5,978,590 A * | 11/1999 | Imai et al. | | 717/177 |
| 6,125,384 A | 9/2000 | Brandt et al. | | |
| 6,223,345 B1 * | 4/2001 | Jones et al. | | 717/100 |
| 6,427,227 B1 * | 7/2002 | Chamberlain | | 717/124 |
| 6,578,199 B1 * | 6/2003 | Tsou et al. | | 717/178 |
| 6,725,453 B1 * | 4/2004 | Lucas et al. | | 717/178 |
| 6,751,794 B1 * | 6/2004 | McCaleb et al. | | 717/168 |
| 6,820,119 B1 * | 11/2004 | Omizo | | 709/223 |
| 6,865,737 B1 * | 3/2005 | Lucas et al. | | 717/178 |
| 6,925,481 B2 | 8/2005 | Singhal et al. | | |
| 7,055,149 B2 * | 5/2006 | Birkholz et al. | | 717/172 |
| 7,062,765 B1 * | 6/2006 | Pitzel et al. | | 717/177 |
| 7,089,552 B2 * | 8/2006 | Atallah | | 717/175 |
| 7,124,409 B2 * | 10/2006 | Davis et al. | | 717/178 |
| 7,143,406 B2 * | 11/2006 | Kenyon et al. | | 717/173 |
| 7,203,940 B2 * | 4/2007 | Barmettler et al. | | 717/178 |
| 7,249,354 B2 * | 7/2007 | Tigani et al. | | 717/177 |
| 7,287,068 B1 * | 10/2007 | Eriksson et al. | | 709/221 |
| 7,305,456 B2 * | 12/2007 | Kobayashi | | 709/218 |
| 7,376,720 B2 * | 5/2008 | Fujii | | 709/221 |
| 7,584,467 B2 * | 9/2009 | Wickham et al. | | 717/171 |
| 7,587,715 B1 * | 9/2009 | Barrett et al. | | 717/176 |

(Continued)

FOREIGN PATENT DOCUMENTS

| | | |
|---|---|---|
| EP | 1284550 | 2/2003 |
| EP | 1411429 | 4/2004 |

(Continued)

OTHER PUBLICATIONS

International Search Report—PCT/US07/086545, International Search Authority—European Patent Office—Apr. 11, 2008.

(Continued)

*Primary Examiner* — Tuan Q. Dam
*Assistant Examiner* — Zheng Wei
(74) *Attorney, Agent, or Firm* — Fariba Yadegar-Bandari (57) ABSTRACT

A server for automatically installing a required application responsive to a client device is described. The server comprises an interface agent arranged to receive a first signal from a client wireless device where the first signal comprises an identifier. A retrieval application is arranged to obtain an executable application corresponding to the identifier and an installer application is arranged to install the executable application responsive to the retrieval application obtaining the executable application. The interface agent is arranged to cause execution of the installed executable application.

22 Claims, 7 Drawing Sheets

(56) References Cited

U.S. PATENT DOCUMENTS

| | | | |
|---|---|---|---|
| 7,603,410 B1* | 10/2009 | Chang et al. | 709/203 |
| 7,661,108 B2* | 2/2010 | Sengodan | 719/315 |
| 7,703,091 B1* | 4/2010 | Martin et al. | 717/174 |
| 8,146,074 B2* | 3/2012 | Ito et al. | 717/170 |
| 2002/0092014 A1* | 7/2002 | Shibusawa et al. | 717/174 |
| 2003/0084439 A1* | 5/2003 | Perkins et al. | 717/177 |
| 2003/0204559 A1* | 10/2003 | Nguyen | 709/203 |
| 2004/0088700 A1* | 5/2004 | Lee et al. | 717/178 |
| 2004/0148525 A1* | 7/2004 | Aida et al. | 713/201 |
| 2005/0044544 A1* | 2/2005 | Slivka et al. | 717/174 |
| 2005/0132359 A1* | 6/2005 | McGuire et al. | 717/175 |
| 2005/0160419 A1* | 7/2005 | Alam et al. | 717/174 |
| 2005/0257209 A1* | 11/2005 | Adams et al. | 717/168 |
| 2006/0059480 A1* | 3/2006 | Kimoto | 717/172 |
| 2006/0195840 A1* | 8/2006 | Sundarrajan et al. | 717/176 |
| 2006/0218548 A1* | 9/2006 | Mason et al. | 717/174 |
| 2006/0225064 A1* | 10/2006 | Lee et al. | 717/168 |
| 2007/0104039 A1* | 5/2007 | Shin et al. | 369/30.05 |
| 2007/0106984 A1* | 5/2007 | Olsen et al. | 717/174 |
| 2007/0220510 A1* | 9/2007 | Bell et al. | 717/174 |
| 2007/0234345 A1* | 10/2007 | Kramer et al. | 717/174 |
| 2007/0234346 A1* | 10/2007 | Kramer et al. | 717/174 |
| 2007/0240150 A1* | 10/2007 | Gangwar et al. | 717/174 |
| 2007/0283346 A1* | 12/2007 | Delgrosso et al. | 717/176 |
| 2008/0052698 A1* | 2/2008 | Olson et al. | 717/168 |
| 2008/0092133 A1* | 4/2008 | Mantere | 717/174 |
| 2008/0263543 A1* | 10/2008 | Ramachandran | 717/177 |
| 2009/0254900 A1* | 10/2009 | Nakamura | 717/176 |

FOREIGN PATENT DOCUMENTS

| | | |
|---|---|---|
| JP | 2000172657 A | 6/2000 |
| JP | 2001337816 A | 12/2001 |
| JP | 2002140532 A | 5/2002 |
| JP | 2004213612 A | 7/2004 |
| JP | 2004264957 A | 9/2004 |
| KR | 100264535 B1 | 9/2000 |
| KR | 20020029029 A | 4/2002 |

OTHER PUBLICATIONS

Translation of Office Action in Korean application 10-2009-7014577 corresponding to U.S. Appl. No. 11/609,462, citing KR20020029029 and KR100264535 dated Jan. 18, 2011.

Written Opinion—PCT/US2007/086545, International Search Authority, European Patent Office, Apr. 11, 2008.

Takahashi, H., et al., "Terminal Service Utilization Method, Windows 2000 Depthful Utilization Skills", Nikkei Business Publications, Inc., Jan. 1, 2000, First Edition, pp. 133-137.

* cited by examiner

APPARATUS AND METHODS FOR CLIENT-DRIVEN SERVER-SIDE INSTALLATION

BACKGROUND

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. However, these smaller and more powerful personal computing devices are typically severely resource constrained. For example, the screen size, amount of available memory and file system space, amount of input and output capabilities and processing capability may each be limited by the small size of the device. Because of such severe resource constraints, it is often typically desirable, for example, to maintain a limited size and quantity of software applications and other information residing on such remote personal computing devices, e.g., client devices.

Wireless devices, e.g., wireless telephones and other portable wireless handheld electronic devices, are able to download and execute varying types of executable content, e.g., application software, etc. In some instances, users of the wireless devices wish to transfer content to/from a processing device, e.g., a personal computer or other processor or logic-based device.

In many instances, the content to be transferred requires a specific application on the processing device in order to enable communication with the wireless device and/or perform the activity requested by the wireless device of the processing device.

SUMMARY

Aspects provide a system, method, and computer-readable medium bearing instructions for client-driven server-side installation.

A server aspect for automatically installing a required application responsive to a client device comprises an interface agent arranged to receive a first signal from a client wireless device, wherein the first signal comprises an identifier; a retrieval application arranged to obtain an executable application corresponding to the identifier; an installer application arranged to install the executable application responsive to the retrieval application obtaining the executable application; and wherein the interface agent is arranged to cause execution of the installed executable application.

A client wireless device aspect for requesting installation of a required application at a server comprises an executable application comprising an application identifier; and an interface agent arranged to transmit an install request to a server, wherein the install request comprises an identifier corresponding to the application identifier.

A method aspect of automatically installing a required application responsive to a client device comprises receiving an install request comprising an identifier from a client device; installing an application determined based on at least a portion of the identifier; executing the application responsive to receipt of the identifier; generating a result responsive to receipt of an action request for the application; and transmitting the generated result to the client device.

A method aspect of requesting installation of and interacting with a required application at a server comprises transmitting an install request to a server, wherein the install request comprises an identifier corresponding to an application identifier; transmitting an action request to the server, responsive to receipt of an acknowledgement message in response to the install request; and receiving a result from the server responsive to the action request.

A processor aspect comprises at least one processor configured to perform the actions of: receiving an install request comprising an identifier from a client device; installing an application determined based on at least a portion of the identifier; executing the application responsive to receipt of the identifier; generating a result responsive to receipt of an action request for the application; and transmitting the generated result to the client device.

Another processor aspect comprises at least one processor configured to perform the actions of: transmitting an install request to a server, wherein the install request comprises an identifier corresponding to an application identifier; transmitting an action request to the server, responsive to receipt of an acknowledgement message in response to the install request; and receiving a result from the server responsive to the action request.

A machine-readable medium aspect comprising instructions stored thereon comprises: a first set of instructions for receiving an install request comprising an identifier from a client device; a second set of instructions for installing an application determined based on at least a portion of the identifier; a third set of instructions for executing the application responsive to receipt of the identifier; a fourth set of instructions for generating a result responsive to receipt of an action request for the application; and a fifth set of instructions for transmitting the generated result to the client device.

Another machine-readable medium aspect comprising instructions stored thereon comprises: a first set of instructions for transmitting an install request to a server, wherein the install request comprises an identifier corresponding to an application identifier; a second set of instructions for transmitting an action request to the server, responsive to receipt of an acknowledgement message in response to the install request; and a third set of instructions for receiving a result from the server responsive to the action request.

A server device aspect for automatically installing a required application responsive to a client device comprises: means for receiving an install request comprising an identifier from a client device; means for installing an application determined based on at least a portion of the identifier; means for executing the application responsive to receipt of the identifier; means for generating a result responsive to receipt of an action request for the application; and means for transmitting the generated result to the client device.

A client device aspect for requesting installation of and interacting with a required application at a server comprises: means for transmitting an install request to a server, wherein the install request comprises an identifier corresponding to an application identifier; means for transmitting an action request to the server, responsive to receipt of an acknowledgement message in response to the install request; and means for receiving a result from the server responsive to the action request.

Still other advantages will become readily apparent to those skilled in the art from the following detailed description, wherein the preferred aspects are shown and described, simply by way of illustration of the best mode contemplated. As will be realized, other and different aspects are possible, and several details are capable of modification in various obvious respects, all without departing from the scope.

DESCRIPTION OF THE DRAWINGS

The described aspects are illustrated by way of example, and not by limitation, in the figures of the accompanying drawings, wherein elements having the same reference numeral designations represent like elements throughout and wherein.

DETAILED DESCRIPTION

Figure 1:
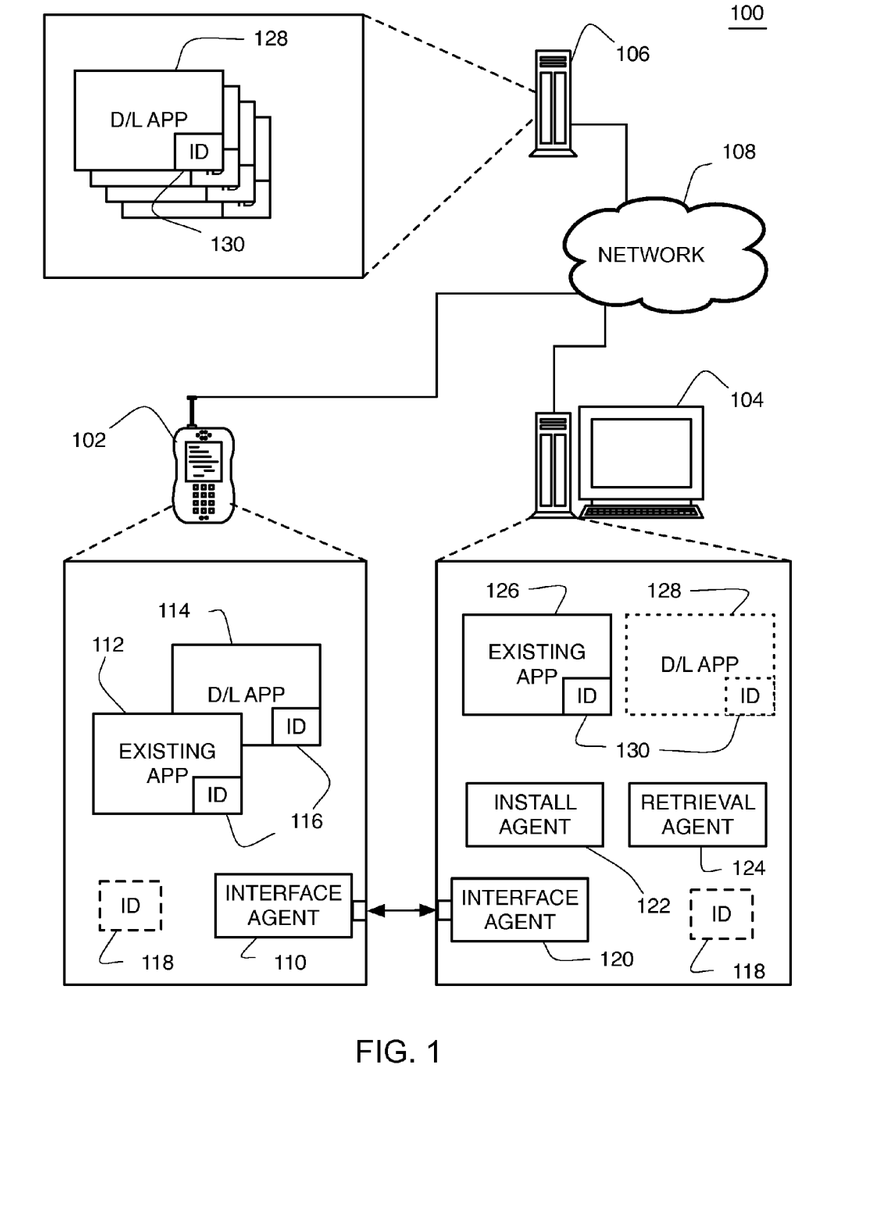
FIG. 1 is a high level block diagram of an architecture of one aspect of the present system.

FIG. 1 depicts a high level block diagram of a system architecture 100 according to an aspect. System architecture 100 comprises a wireless client device 102 (also referred to as client device), a server 104, a data store 106, and a network 108 communicatively coupling the client device, server, and data store. Client device 102 requests server 104 to perform an action using a predetermined application. The request includes an identifier specifying the predetermined application which server 104 is requested to use to perform the action. If the predetermined application is not installed on server 104, the server retrieves the predetermined application from data store 106, installs the application, and causes execution of the application to communicate with client device 102.

Client device 102 comprises an interface agent 110 for communicating with server 104, an existing client application 112, and a downloaded (D/L) client application 114.

Client applications (existing application 112 and/or D/L application 114) comprise executable instructions which, when executed by client device 102, cause the client device to perform a predetermined functionality, e.g., remote file viewing and/or manipulation, web camera control and viewing, browsing e-mail on a desktop computer, manipulating a playlist on a car stereo from a phone or other mobile device, etc., in conjunction with server 104. Existing client application 112 and D/L client application 114 each comprise a client application identifier (ID) 116 uniquely identifying the particular client application. Client device 102 also optionally comprises a device ID 118 uniquely identifying the client device, e.g., a serial number, model number, etc.

In at least some aspects, existing client application 112 comprises a client application which may be pre-installed and/or a portion of existing executable instructions on client device 102. D/L client application 114 may be uploaded, downloaded, or otherwise transferred to client device 102 and may further comprise an updated existing client application 112 and/or an extension to such a client application. In at least some aspects, client application ID 116 uniquely identifies an application type, e.g., a remote file viewing application, etc.

Client application(s) 112, 114 generates and transmits an install request 200 (FIG. 2) to server 104 via interface agent 110. Install request 200 causes server 104 to determine whether a corresponding server application is installed on the server which can perform the requested functionality of client application 112, 114 generating the install request.

Interface agent 110 establishes communication between client device 102 and server 104 via network 108. In at least some aspects, interface agent 110 may be one of a part of an operating system, a set of executable instructions as part of a runtime environment, and a set of executable instructions such as a client application 112, 114.

Responsive to install request 200 (FIG. 2) received from client application(s) 112, 114, interface agent 110 transmits the install request to a connected server 104 with which the interface agent has established communication. After receipt of an acknowledgement from server 104, interface agent 110 transmits the received acknowledgement to the appropriate client application(s) 112, 114. Interface agent 110 proceeds to transmit messages received from client application(s) 112, 114 to server 104 and messages received from server 104 to the client application(s).

In at least some aspects, interface agent 110 provides communication information to client application(s) 112, 114 to enable the client application(s) to communicate directly with server 104. In at least some aspects, interface agent 110 comprises security functionality requiring authentication and authorization of server 104 to enable further communication between client application(s) 112, 114 and server 104. Security functionality may be implemented using password exchange, digital signature and/or certificate, encryption, public-private key pairing and other security mechanisms.

Server 104 is a processing device, e.g., a processor or other logic-based device such as a personal computer, laptop, desktop, server, etc. Server 104 comprises an interface agent 120 for communicating with client device 102, an install agent 122, a retrieval agent 124, and an existing server application 126. Server 104 optionally comprises a D/L server application 128. Server application(s) 126, 128 each comprise a server application ID 130 uniquely identifying the particular server application. Server 104 also optionally comprises a device ID 118 as described above with respect to client device 102.

In at least some aspects, existing server application 126 comprises a server application which may be pre-installed and/or a portion of existing executable instructions on server 104. D/L server application 126 may be uploaded, downloaded, or otherwise transferred to server 104 and may further comprise an updated existing server application 126 and/or an extension to such a server application. In at least some aspects, server application ID 130 uniquely identifies an application type, e.g., a remote file viewing server application, etc.

Interface agent 120 responds to interface agent 110 to establish communication with client device 102 via network 108. In at least some aspects, interface agent 120 may be one of a part of an operating system, a set of executable instructions as part of a runtime environment, and a set of executable instructions such as a server application 126, 128.

Responsive to receipt of an install request 200 (FIG. 2) from client device 102, interface agent 120 determines whether a corresponding server application 126, 128 is installed on server 104. If a corresponding server application 126, 128 is installed on server 104, interface agent 120 determines if the server application is executing. If a corresponding server application 126, 128 is not executing, interface agent 120 causes execution of the server application and transmits an acknowledgement to client device 102. If a corresponding server application 126, 128 is installed and executing on server 104, interface agent 120 transmits an acknowledgement to client device 102.

If a corresponding server application 126, 128 is not installed on server 104, interface agent 120 transmits an application retrieval request to retrieval agent 124. As described below, retrieval agent 124 obtains the particular D/L server application 126, 128 and causes install agent 122 to install the D/L server application. Responsive to an install server application complete message from install agent 122, interface agent 120 causes the installed application to begin execution. After installation of D/L server application 128, interface agent 120 transmits the acknowledgement to client device 102.

In at least some aspects, server 104, e.g., retrieval agent 124 and/or install agent 122, comprises security functionality requiring authentication and authorization of D/L server application 128 to enable download and/or installation of the D/L server application on the server. Security functionality may be implemented using password exchange, digital signature and/or certificate, encryption, public-private key pairing and other security mechanisms. Server 104, by way of one or both of retrieval agent 124 and/or install agent 122, verifies that D/L server application 128 is from a trusted source and accepted to be executed by the server. In at least some aspects, server 104 trusts a predetermined number of signing authorities and data store 106 transmits a digital certificate along with a D/L server application 128 to the server. In at least some aspects, the trust relationship between server 104 and the signing authority of D/L server application 128 is logically distinct from the trust relationship between the server and data store 106.

Interface agent 120 proceeds to transmit messages received from client device 102 to server application(s) 126, 128 and messages received from server application(s) 126, 128 to the client device. In at least some aspects, interface agent 120 provides communication information to server application(s) 126, 128 to enable the server application(s) to communicate directly with client device 102. In at least some aspects, interface agent 120 comprises security functionality requiring authentication and authorization of client device 102 to enable further communication between server application(s) 126, 128 and the client device. Security functionality may be implemented using password exchange, encryption, public-private key pairing and other security mechanisms.

Responsive to an application retrieval request received from interface agent 120, retrieval agent 124 communicates with data store 106 via network 108 to obtain a D/L server application 128 based on at least a portion of install request 200 (FIG. 2). In at least some aspects, retrieval agent 124 transmits a query to data store 106 in order to identify the appropriate D/L server application 128. Retrieval agent 124 may download D/L server application 128 from data store 106 and/or the data store may upload the D/L server application to the retrieval agent.

After D/L server application 128 is retrieved by retrieval agent 124, the retrieval agent transmits an install server application request to install agent 122. In at least some aspects, the install server application request comprises an indication that a D/L server application 128 has been retrieved and requesting install agent 122 to install the application. In at least some further aspects, the install server application request comprises D/L server application 128 as retrieved and a request to install the application.

Responsive to an install server application request received from retrieval agent 124, install agent 122 installs D/L server application 128 and transmits an install server application complete message to interface agent 120.

In at least some aspects, install agent 122 and retrieval agent 124 are combined into a single agent. In at least some further aspects, two or more of install agent 122, retrieval agent 124, and interface agent 120 are combined into one or more agents.

Data store 106 comprises a processing device, e.g., a processor or other logic-based device such as a personal computer, laptop, desktop, server, etc. Data store 106 comprises one or more D/L server application(s) 128 available to be transferred to server 104.

In at least some aspects, data store 106 includes functionality for responding to a query received from server 104 for a particular D/L server application 128.

Network 108 comprises wireless and/or wired communication connections. In at least some aspects, client device 102 may be directly connected via wired and/or wireless connection to server 104.

Figure 2A:
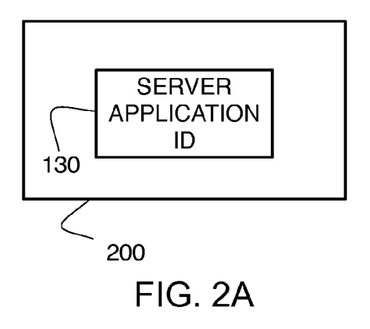
FIGS. 2A-2D are block diagrams of an install request according to an aspect.

FIGS. 2A-2D depict block diagrams of differing aspects of install request 200 which are useable to advantage in conjunction with the present system. FIG. 2A depicts install request 200 comprising server application ID 130. With respect to the aspect of FIG. 2A, install request 200 specifies a particular server application with which client device 102 will communicate. In at least some aspects, server application ID 130 specifies a particular server application, e.g., by name or other identifier, by type, by file extension, by uniform resource locator (URL), and/or other mechanisms for specifying an application. Responsive to receiving a specification by type, file extension, or other inclusive specification, server 104 determines which server application(s) 16, 128 correspond to the specified inclusive specification. As described above, if the corresponding server application(s) 126, 128 is not installed on server 104, the server proceeds to attempt to retrieve the application from data store 106.

In at least some further aspects, server application ID 130 may specify a particular protocol in accordance with which client device 102 will communicate with server 104. Responsive to receiving a protocol specification, server 104 determines which server application(s) 126, 128 correspond to the specified protocol.

In at least some other further aspects, server application ID 130 may specify a particular data exchange language to be used to communicate between client device 102 and server 104, e.g., XML and/or another structured data language.

Figure 2B:
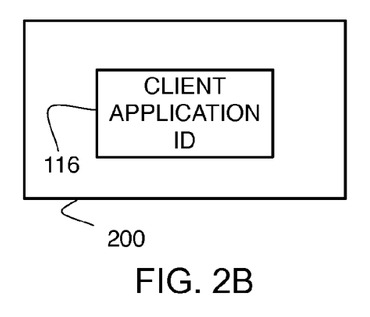

FIG. 2B depicts install request 200 comprising client application ID 116. With respect to the aspect of FIG. 2B, install request 200 specifies a requesting client application 112, 114 with which server 104 will communicate. In at least some aspects, client application ID 116 specifies a particular client application 112, 114, e.g., by name or other identifier, by an alphabetic and/or numeric identifier, by type, by file extension, by URL, and/or other mechanisms for specifying an application. Responsive to receiving a specification by type, file extension, or other inclusive specification, server 104 determines which server application(s) 16, 128 correspond to the specified inclusive specification. As described above, if the corresponding server application(s) 126, 128 is not installed on server 104, the server proceeds to attempt to retrieve the application from data store 106.

Figure 2C:
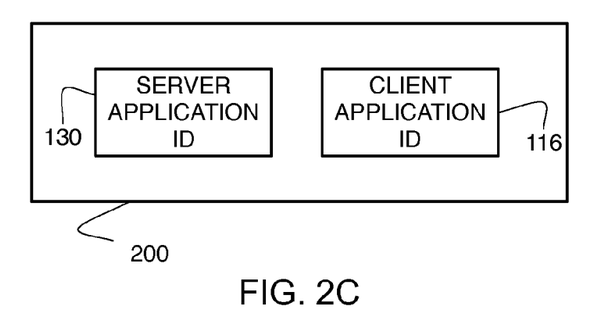

FIG. 2C depicts install request 200 comprising server application ID 130 and client application ID 116. Either or both of server application ID 130 and client application ID 116 may be as described above with respect to the aspects of FIGS. 2A and/or 2B. Similar to the aspects of FIGS. 2A and 2B, operation using install request 200 of the aspect of FIG. 2C proceeds along one or both of the above-described functionality with respect to FIGS. 2A and/or 2B.

Figure 2D:
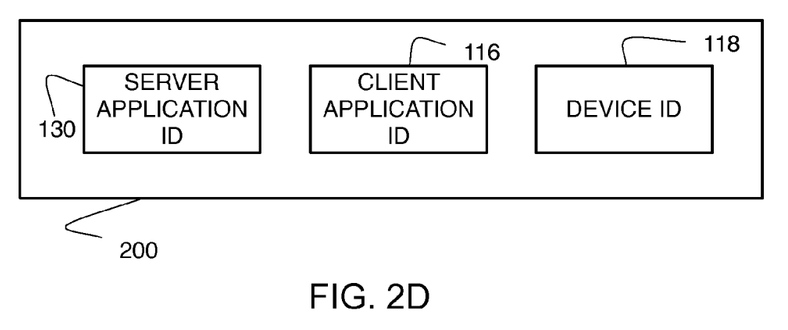

FIG. 2D depicts install request 200 comprising server application ID 130, client application ID 116, and device ID 118. Either or both of server application ID 130 and client application ID 116 may be as described above with respect to the aspect of FIG. 2C.

Figure 3:
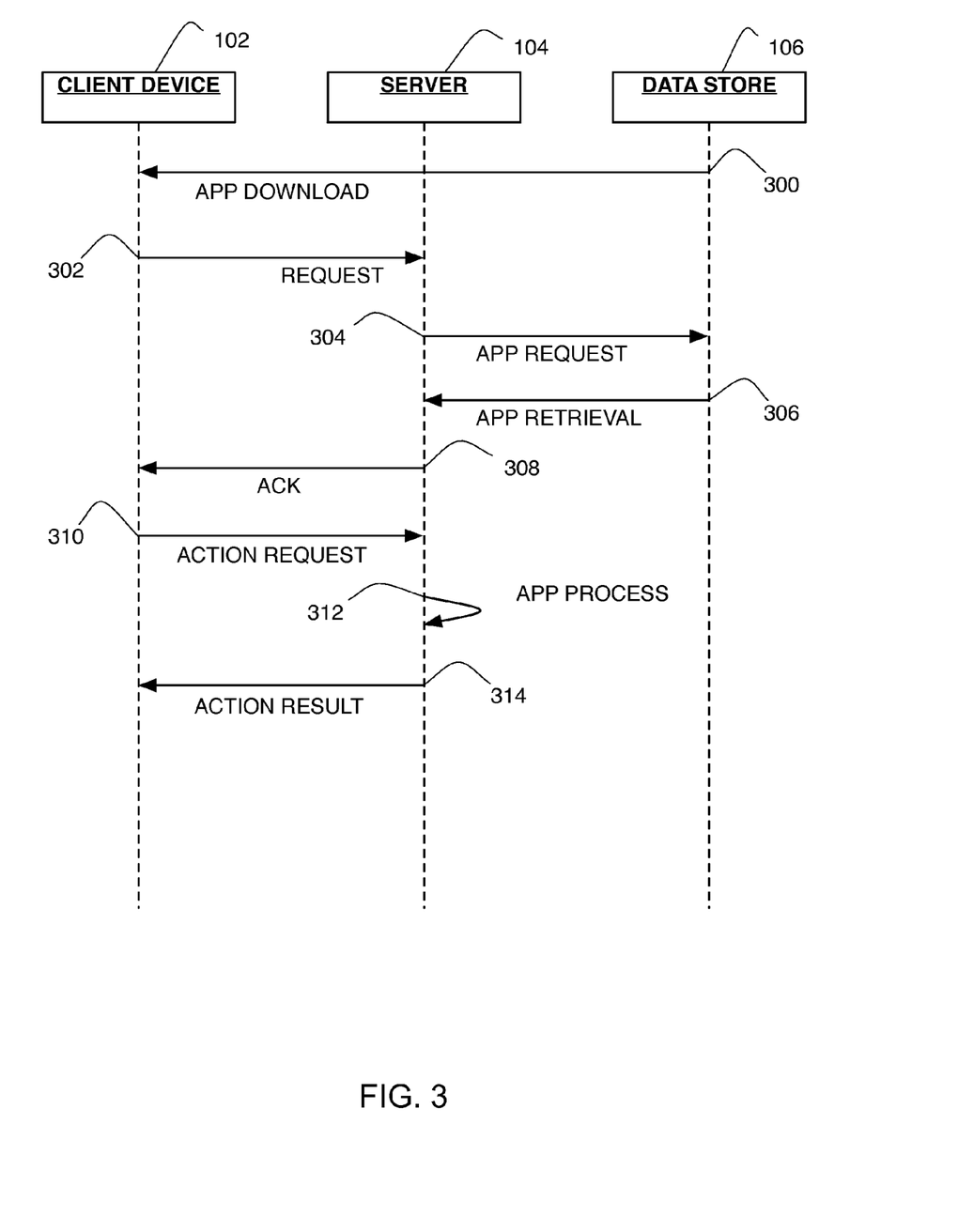
FIG. 3 is a high level message sequence diagram according to an aspect.

FIG. 3 is a high level message sequence diagram of operation according to an aspect. Time proceeds downward along the length of the page. At the outset, client device 102 and server 104 comprise, respectively, an installed interface agent 110 and interface agent 120. As depicted, client device 102 downloads a D/L client application 114 (sequence 300) from data store 106. Client device 102 transmits an install request 200 to server 104 (sequence 302) requesting the server to install and/or execute a server application (126, 128) to communicate with client device 102.

In at least some aspects, install request 200 may be an install request according to one, a combination of two or more, or a variation on one or more of the aspects described above with respect to FIGS. 2A-2D.

After receipt of install request 200, server 104 determines, based on at least a portion of the install request, that the requested server application (126, 128) is not installed on the server and transmits a request for an appropriate server application to data store 106 (sequence 304). After receipt of the application request from server 104, data store 106 determines, based on at least a portion of the application request, a requested D/L server application 128 and transmits the D/L server application to the server (sequence 306). In at least some aspects, server 104 transmits at least a portion of the received install request 200 to data store 106.

After receipt of requested D/L server application 128, server 104 installs and causes the application to execute and transmits an acknowledgement message (ACK) to client device 102 (sequence 308). After receipt of the acknowledgement message from server 104, client device 102 transmits an action requested to be performed by server 104 using D/L server application 128 (sequence 310).

After receipt of the action request from client device 102, server 104, and more specifically D/L server application 128, performs the requested action (sequence 312). After server 104 performs the requested action, the server transmits the result of the action to client device 102.

In at least some aspects, the action requested by client device 102 may require a one-time response, a periodic response, and/or a response on a predetermined on-going basis. For example, a client application (112, 114) may request continuous update of information from server 104 such as server status, etc. In another non-limiting example, client application (112, 114) may request update of information from server 104 based on a change of the information. In at least some further aspects, the action requested by client device 102 may require no response be provided to the client device.

In at least some aspects, interface agents 110, 120 may be pre-installed on client device 102 and server 104, respectively, e.g., at the time of manufacture. In at least some other aspects, one or both of interface agents 110, 120 may be downloaded at a later time.

In at least some aspects, the client application requesting an action be performed on server 104 may be an existing application 112 on client device 104. In at least some aspects, client device 102 and/or server 104 may require transfer of a device ID 118 to the other either as part of a message transfer or outside of a message transfer, e.g., by user input, in order to authenticate and/or authorize a request.

Figure 4:
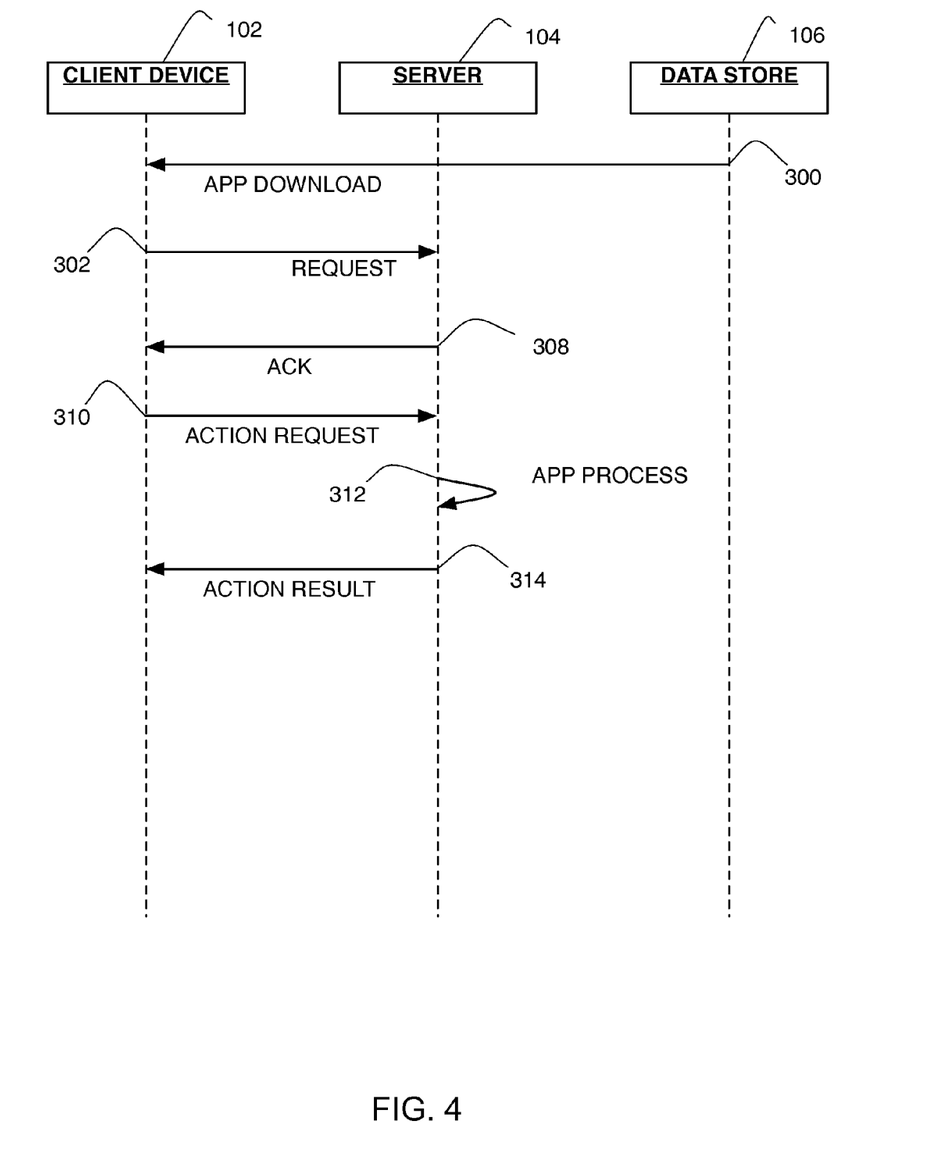
FIG. 4 is a high level message sequence diagram according to another aspect.

FIG. 4 depicts a high level message sequence diagram of operation according to another aspect. At the outset, client device 102 and server 104 comprise, respectively, an installed interface agent 110 and interface agent 120. Further, in the aspect of FIG. 4, server 104 comprises an appropriate server application 126, 128 able to perform a requested action from client device 102 installed on the server.

The message sequence proceeds as described above with respect to FIG. 3; however, after receipt of install request 200 from client device 102 (sequence 302), server 104 determines that the appropriate server application 126, 128 is installed on the server, causes the application to execute (if not already executing), and transmits an acknowledgement message to the client device (sequence 308). The flow continues as described above with respect to FIG. 3.

Figure 5:
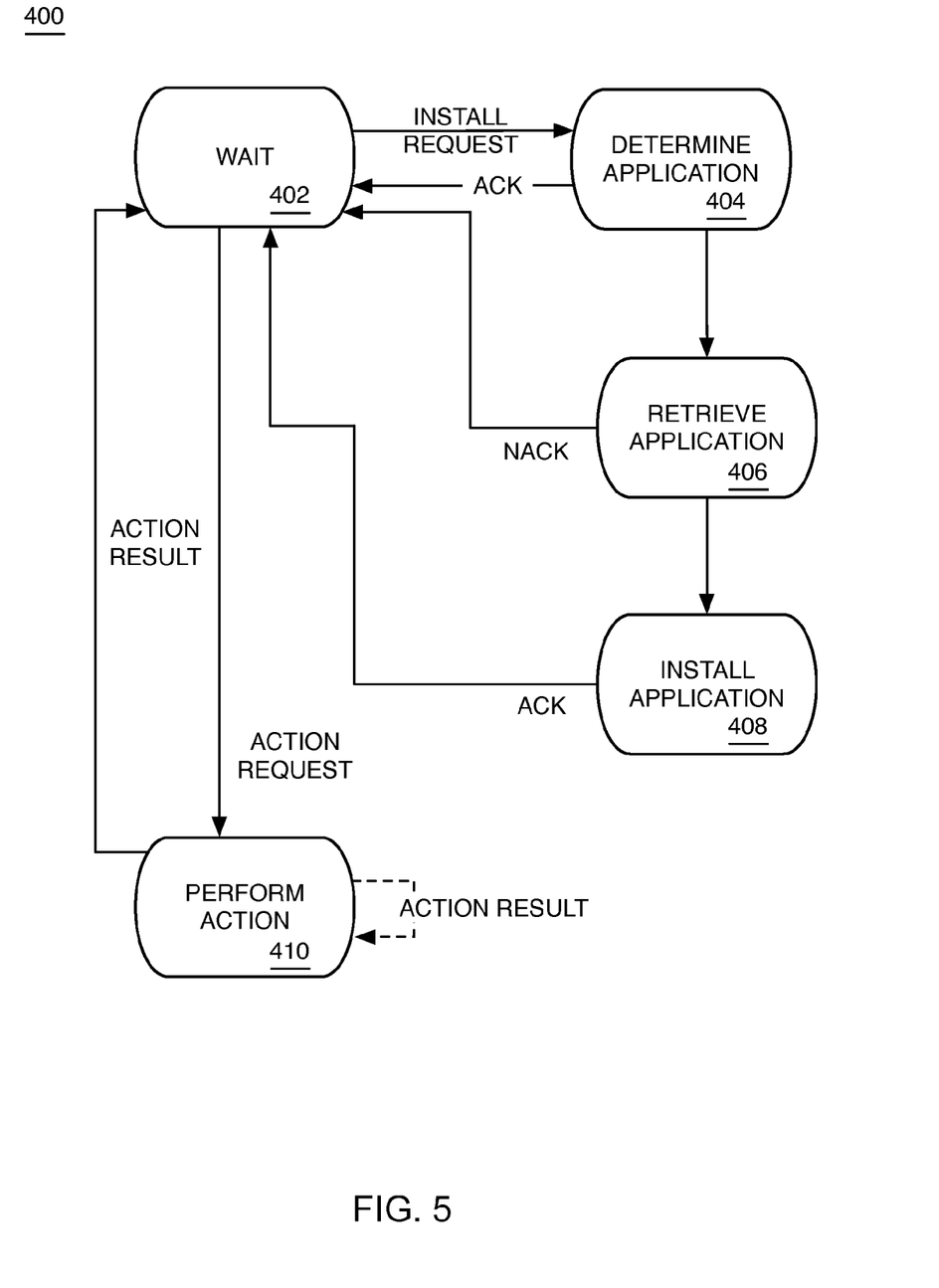
FIG. 5 is a high level process flow diagram according to an aspect.

FIG. 5 depicts a high level process flow diagram of a process flow portion 400 of server 104 according to an aspect. Process flow 400 begins at a wait state 402 of server 104. Responsive to receipt of install request 200, the flow proceeds to determine whether a server application 126, 128 corresponding to at least a portion of the install request is installed on server 104 (determine application state 404).

If a server application 126, 128 is installed, server 104 transmits an acknowledgement message and the flow returns to wait state 402. If a server application 126, 128 is not installed, the flow proceeds to attempt to obtain a server application 128 from data store 106 (retrieve application state 406). During retrieve application state 406, server 104 attempts to obtain server application 128 from data store 106.

If server 104 is able to obtain D/L server application 128 from data store 106, the flow proceeds to install the D/L server application on the server (install application 408). After installation of D/L server application 128 on server 104, server 104 transmits the acknowledgement message to client device 102 and the flow proceeds to return to wait state 402. In at least some aspects, if server 104 is able to establish trust, i.e., verify and/or validate the signing authority for a particular D/L server application 128, for the D/L server application, the server proceeds to transmit the acknowledgement message to client device 102, as described.

If server 104 is unable to obtain D/L server application 128 from data store 106, server 104 transmits a negative acknowledgement message to client device 102 and the flow returns to wait state 402. The negative acknowledgement message indicates that server 104 cannot respond to the request from client device 102. In at least some aspects, if server 104 is not able to establish trust for D/L server application 128, the server proceeds to transmit the negative acknowledgement message to client device 102, as described.

Responsive to receipt of a request for action from client device 102, the flow proceeds to perform the requested action, i.e., server application 126, 128 performs the requested action (perform action state 410). After performing the requested action, server 104 transmits the action result to client device 102 and the flow proceeds to return to wait state 402. In at least some aspects, server 104 transmits the action result to client device 102 and the flow returns to perform action state 410 (dashed line action result). According to this aspect, the dashed line action result transition may be executed one or more times on a periodic or predetermined basis to provide action results to client device 102.

Some of the personal computing devices utilize application programming interfaces (APIs), sometimes referred to as runtime environments and software platforms, that are installed onto their local computer platform and which are used, for example, to simplify operations of such devices, such as by providing generalized calls for device specific resources. Further, some such APIs are also known to provide software developers the ability to create software applications that are fully executable on such devices. In addition, some of such APIs are known to be operationally located between the computing device system software and the software applications such that the computing device computing functionality is made available to the software applications without requiring the software developer to have the specific computing device system source code. Further, some APIs are known to provide mechanisms for secure communications between such personal devices (i.e., clients) and remote devices (i.e., servers) using secure cryptographic information.

Examples of such APIs, some of which are discussed in more detail below, include versions of the Binary Runtime Environment for Wireless® (BREW®) developed by Qualcomm, Inc., of San Diego, Calif. BREW® is sometimes described as a thin veneer existing over a computing device's (typically a wireless cellular phone) operating system, which, among other features, provides interfaces to hardware features particularly found on personal computing devices. BREW® is further characterized by, at least, the one advantage of being able to be provided on such personal computing devices at a relatively low cost with respect to demands on such device resources and with respect to the price paid by consumers for devices containing the BREW® API. Other features known to be associated with BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security and application distribution functionality, and the client performs, for example, application execution, security and user interface functionality.

One or more aspects are used in conjunction with a runtime environment, or application programming interface (API), executing on the computing device. One such runtime environment or API is Binary Runtime Environment for Wireless® (BREW®) software previously discussed. However, one or more of the described aspects can be used with other types of runtime environments/APIs that, for example, operate to control the execution of applications on wireless client computing devices.

Figure 6:
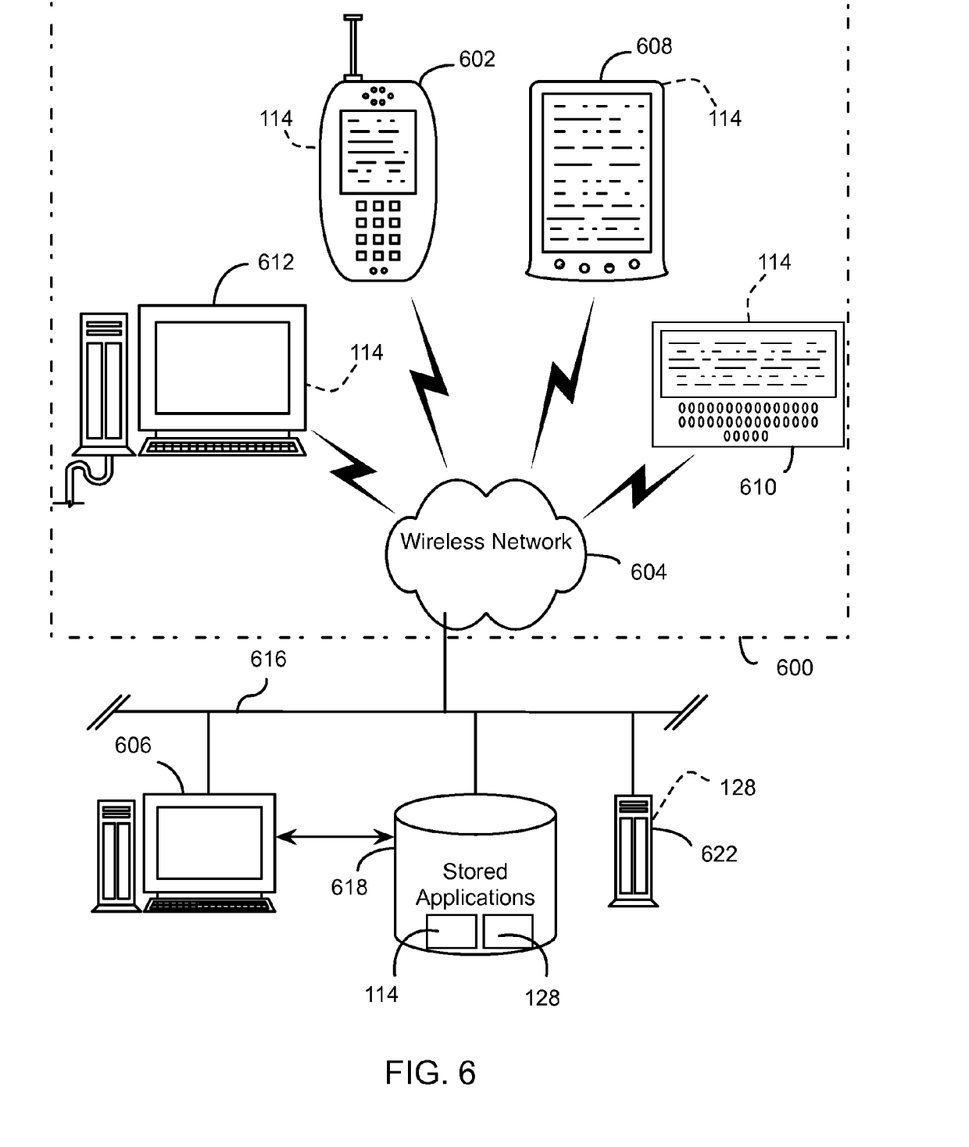
FIG. 6 is a high level functional block diagram of a system useable in conjunction with an aspect.

FIG. 6 illustrates a block diagram of one exemplary aspect of a wireless system 600. System 600 can contain client wireless devices, such as cellular telephone 602, in communication across a wireless network 604 with at least one application download server 606, e.g., data store 106, that selectively transmits software applications and components to wireless devices across a wireless communication portal or other data access to the wireless network 604, e.g., network 108. As shown here, the wireless (client) device can be a cellular telephone 602, a personal digital assistant 608, a pager 610, which is shown here as a two-way text pager, or even a separate computer platform 612 that has a wireless communication portal. For example, wireless device 102 includes a transceiver or communication device for transmitting and receiving data, a processor for executing instructions and controlling operation of the wireless device, and a memory for storing the executable instructions, client application(s) 112, 114, device ID 118, and interface agent 110. The aspects can thus be realized on any form of client device including a wireless communication portal, e.g., a communication device, including without limitation, wireless modems, PCMCIA cards, personal computers, access terminals, telephones, or any combination or sub-combination thereof.

The application download server 606 is shown here on a network 616 with other computer elements in communication with the wireless network 604. There can be a stand-alone server 622, and each server can provide separate services and processes to the client devices 602, 608, 610, 612 across the wireless network 604. System 600 may also include at least one stored application database 618, e.g., data store 106 that holds the software applications, e.g., a D/L server application 128 and a D/L client application 114, that are downloadable by the server 622 (the D/L server application is indicated as being downloadable to the server by a dashed line and the D/L client application is indicated as being downloadable to the client device by a dashed line). However, those skilled in the art will appreciate that the configuration illustrated in FIG. 6 is merely exemplary. Accordingly, other aspects can include one of more servers that can each perform all the described functions and contain all necessary hardware and software, or can contain only selected functionality.

Figure 7:
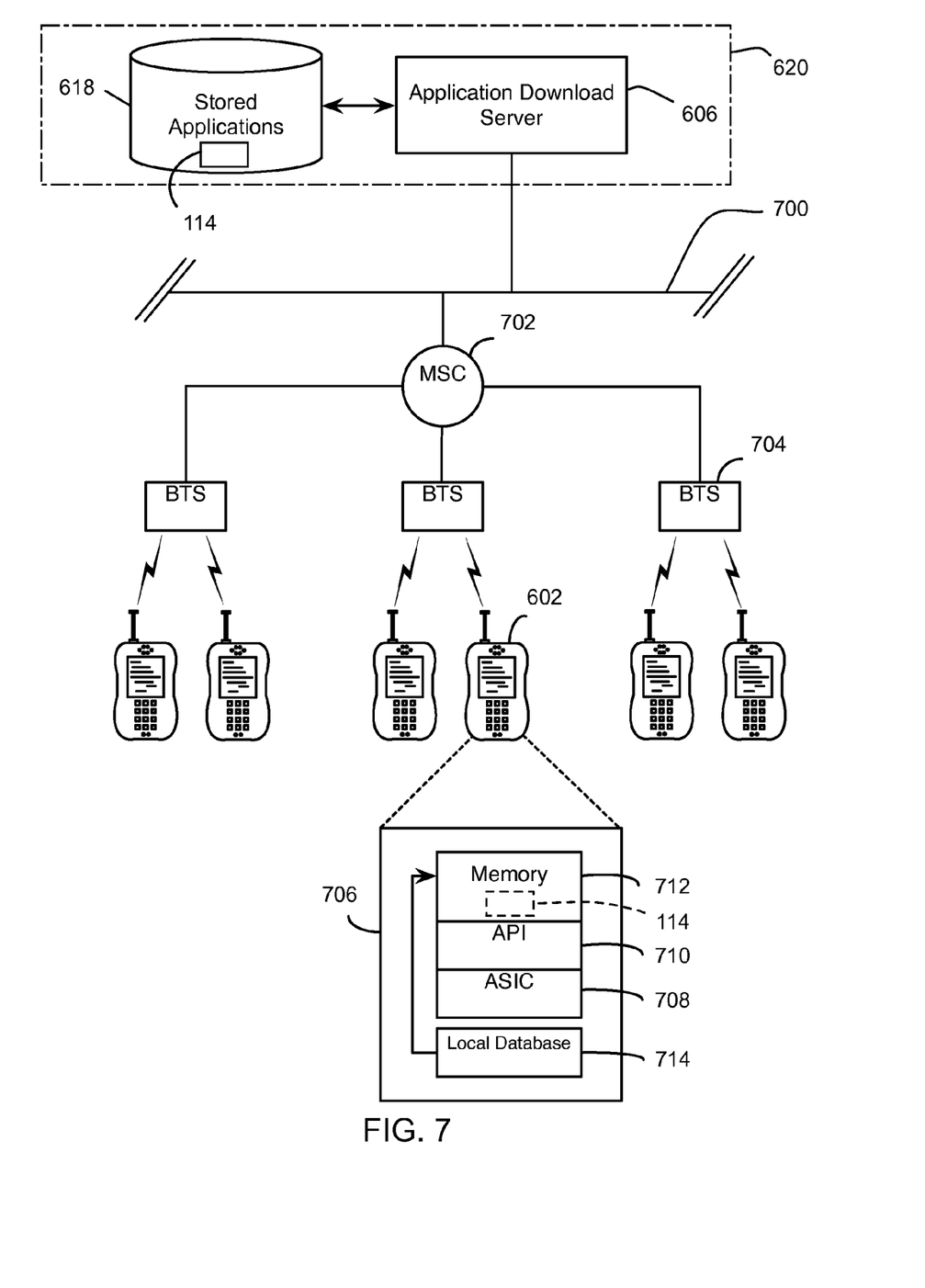
FIG. 7 is a high level block diagram of another aspect of the present system.

In FIG. 7, a block diagram is shown that more fully illustrates system 600, including the components of the wireless network 604 and interrelation of the elements of the exemplary aspects. System 600 is exemplary and can include any system whereby remote client devices, such as wireless client computing devices 602, 608, 610, 612 communicate over-the-air between and among each other and/or between and among components connected via a wireless network 604, including, without limitation, wireless network carriers and/or servers. The application download server 606 and the stored application database 618 communicate with a carrier network 700, through a data link, such as the Internet, a secure LAN, WAN, or other network. Stored application database 618 includes a D/L client application 114 according to the above-described aspects for download to each of the wireless client computer devices 602, 608, 610, 612. Wireless client computer devices 602, 608, 610, 612 download a copy of D/L client application 114 (dashed line) from stored applications database 618. In the aspect shown, a server 620 can include the application download server 606, distribution server 622 and the stored application database 618. However, these servers can also be independent devices.

Still referring to the aspect of FIG. 7, carrier network 700 controls messages (generally being data packets) sent to a messaging service controller (MSC) 702. Carrier network 700 communicates with the MSC 702 through another communications link, such as another network, the Internet, and/or POTS (plain ordinary telephone system). Typically, the network or Internet connection between carrier network 700 and MSC 702 transfers data, and the POTS transfers voice information. MSC 702 may be connected to multiple base stations (BTS) 704, such as by at least one communications link, including both a data network and/or the Internet for data transfer and POTS for voice information. BTS 704 ultimately broadcasts messages wirelessly to the wireless communications devices, such as cellular telephones 602, in an over-the-air protocol such as short messaging service (SMS), etc.

In the aspect of FIG. 7, each wireless device, such as cellular telephones 602, may include a computer platform 706 that can receive and execute software applications and display data transmitted from computer system 620 or other network servers 622. Computer platform 706 may include an application-specific integrated circuit (ASIC) 708, or other chipset, processor, microprocessor, logic circuit, or other data processing device. ASIC 708 may be installed at the time of manufacture of cellular telephone 602. ASIC 708 or other processor may execute an application programming interface (API) layer 710 that interfaces with any resident programs, e.g., D/L client application 114, in a memory 712 of the wireless device. API 710 is a runtime environment executing on the computing device, or cellular telephone 602 in this case. One such runtime environment is Binary Runtime Environment for Wireless® (BREW®) software, although other runtime environments may be utilized that, for example, operate to control the execution of applications on wireless computing devices. Memory 712, for example, can be comprised of at least one of read-only and random-access memory (RAM and ROM), EPROM, EEPROM, flash cards, and any memory common to computer platforms. The computer platform 706 may also include a local database 714 that can hold the software applications, e.g., D/L client application 114, files, or data not actively used in memory 712. Local database 714 may include at least one of flash memory cells, magnetic media, EPROM, EEPROM, optical media, tape, a soft disk, a hard disk, and any other type of secondary or tertiary memory. Thus, in the aspect of FIG. 7, each cellular telephone 602 may be loaded with applications such as D/L client application 114 and/or data from computer system 620 in accordance with system 600.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the foregoing disclosure shows illustrative aspects and/or embodiments, it should be noted that various changes and modifications could be made herein without departing from the scope of the described aspects and/or embodiments as defined by the appended claims. Furthermore, although elements of the described aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A server for automatically installing a server-side application responsive to a client device, the server comprising:
   interface agent logic arranged to receive an install request from the client device, wherein the install request comprises at least one identifier, wherein the request is configured to request that the server install the server-side application, wherein, once installed, the server-side application is configured to interact with and support a client-side application that is installed on the client device;
   retrieval logic arranged to obtain the server-side application based upon the at least one identifier; and
   installer logic arranged to install the server-side application,
   wherein the interface agent logic is arranged to execute the server-side application.

2. The server as claimed in claim 1, wherein the at least one identifier includes an identifier that identifies the server-side application.

3. The server as claimed in claim 1, wherein the at least one identifier includes an identifier that identifies the client device.

4. The server as claimed in claim 1,
   wherein the retrieval logic obtains the server-side application from a data store that stores a plurality of applications including the server-side application.

5. The server as claimed in claim 1, wherein the retrieval logic is further arranged to authenticate the server-side application.

6. A client device configured to request installation of a server-side application at a server, the client device comprising:
   client-side application logic configured to execute a client-side application; and
   interface agent logic arranged to transmit an install request to the server, wherein the install request comprises at least one identifier, wherein the install request is configured to request that the server install the server-side application, wherein, once installed, the server-side application is configured to interact with and support the client-side application.

7. The client device as claimed in claim 6, wherein the client-side application comprises at least one of a pre-installed application and a downloaded application.

8. The client device as claimed in claim 6, wherein the at least one identifier includes an identifier that identifies the client device.

9. The client device as claimed in claim 6, wherein the at least one identifier comprises an identifier that identifies the client-side application.

10. The client device as claimed in claim 6, wherein the at least one identifier comprises an identifier that identifies the server-side application.

11. A method of automatically installing a server-side application responsive to a request from a client device, comprising:
    receiving, at a server, an install request comprising at least one identifier from the client device, wherein the install request is configured to request that the server install the server-side application, wherein, once installed, the server-side application is configured to interact with and support a client-side application that is installed on the client device;

installing the server-side application based on at least a portion of the at least one identifier;

generating a result responsive to receipt of an action request that requests at least one action to be performed by the server-side application; and transmitting the generated result to the client device.

12. The method of claim 11, wherein the client-side and server-side applications correspond to different applications that, when executed at the client device and the server, respectively, perform a coordinated communication function.

13. The method of claim 11, wherein the installing includes:

determining, in response to the install request, that the server-side application is not available at the server;

transmitting a request for the server-side application from a network storage device;

receiving the server-side application from the network storage device in response to the transmitted request; and installing the server-side application on the server.

14. The method of claim 11, wherein the at least one identifier includes (i) a first identifier that identifies the client-side application, or (ii) the first identifier and also a second identifier that identifies the server-side application, or (iii) the first and second identifiers and also a third identifier that identifies the client device.

15. The method of claim 11, wherein the installing comprises authenticating the server-side application.

16. A method of requesting installation of and interacting with a server-side application at a server, comprising:

transmitting, from a client device, an install request to the server, wherein the install request comprises at least one identifier, wherein the install request is configured to request that the server install the server-side application, wherein, once installed, the server-side application is configured to interact with and support a client-side application on the client device;

receiving an acknowledgment to the install request from the server;

transmitting, responsive to the received acknowledgment, an action request to the server that requests at least one action to be performed by the server-side application; and receiving a result from the server responsive to the action request.

17. At least one processor on a server that is configured to install a server-side application responsive to a request from a client device, the at least one processor configured to perform the actions of:

receiving, at the server, an install request comprising an at least one identifier from the client device, wherein the install request is configured to request that the server install the server-side application, wherein, once installed, the server-side application is configured to interact with and support a client-side application that is installed on the client device;

installing the server-side application based on at least a portion of the at least one identifier;

generating a result responsive to receipt of an action request that requests at least one action to be performed by the server-side application; and transmitting the generated result to the client device.

18. At least one processor on a client device that is configured to request installation of a server-side application at a server, the at least one processor configured to perform the actions of:

transmitting, from the client device, an install request to the server, wherein the install request comprises at least one identifier, wherein the install request is configured to request that the server install the server-side application, wherein, once installed, the server-side application is configured to interact with and support a client-side application on the client device;

receiving an acknowledgment to the install request from the server;

transmitting, responsive to the received acknowledgment, an action request to the server that requests at least one action to be performed by the server-side application; and receiving a result from the server responsive to the action request.

19. A non-transitory machine-readable medium comprising instructions stored thereon, comprising:

a first set of instructions for receiving, at a server, an install request comprising an at least one identifier from a client device, wherein the install request is configured to request that the server install the server-side application, wherein, once installed, the server-side application is configured to interact with and support a client-side application that is installed on the client device;

a second set of instructions for installing the server-side application based on at least a portion of the at least one identifier;

a third set of instructions for generating a result responsive to receipt of an action request that requests at least one action to be performed by the server-side application; and a fourth set of instructions for transmitting the generated result to the client device.

20. A non-transitory machine-readable medium comprising instructions stored thereon, comprising:

a first set of instructions for transmitting, from a client device, an install request to a server, wherein the install request comprises at least one identifier, wherein the install request is configured to request that the server install the server-side application, wherein, once installed, the server-side application is configured to interact with and support a client-side application on the client device;

a second set of instructions receiving an acknowledgment to the install request from the server;

a third set of instructions for transmitting, responsive to the received acknowledgment, an action request to the server that requests at least one action to be performed by the server-side application; and a fourth set of instructions for receiving a result from the server responsive to the action request.

21. A server configured to install a server-side application responsive to a request from a client device, comprising:

means for receiving an install request comprising at least one identifier from the client device, wherein the install request is configured to request that the server install the server-side application, wherein, once installed, the server-side application is configured to interact with and support a client-side application that is installed on the client device;

means for installing the server-side application based on at least a portion of the at least one identifier;

means for generating a result responsive to receipt of an action request that requests at least one action to be performed by the server-side application; and means for transmitting the generated result to the client device.

22. A client device for requesting installation of and interacting with a server-side application at a server, comprising:
- means for transmitting an install request to the server, wherein the install request comprises at least one identifier, wherein the install request is configured to request that the server install the server-side application, wherein, once installed, the server-side application is configured to interact with and support a client-side application on the client device;
- means for receiving an acknowledgment to the install request from the server;
- means for transmitting, responsive to the received acknowledgment, an action request to the server that requests at least one action to be performed by the server-side application; and
- means for receiving a result from the server responsive to the action request.

* * * * *